Oct. 15, 1929.   J. E. WRIGHT   1,731,557
HIGHWAY VEHICLE
Filed Jan. 23, 1926   2 Sheets-Sheet 1
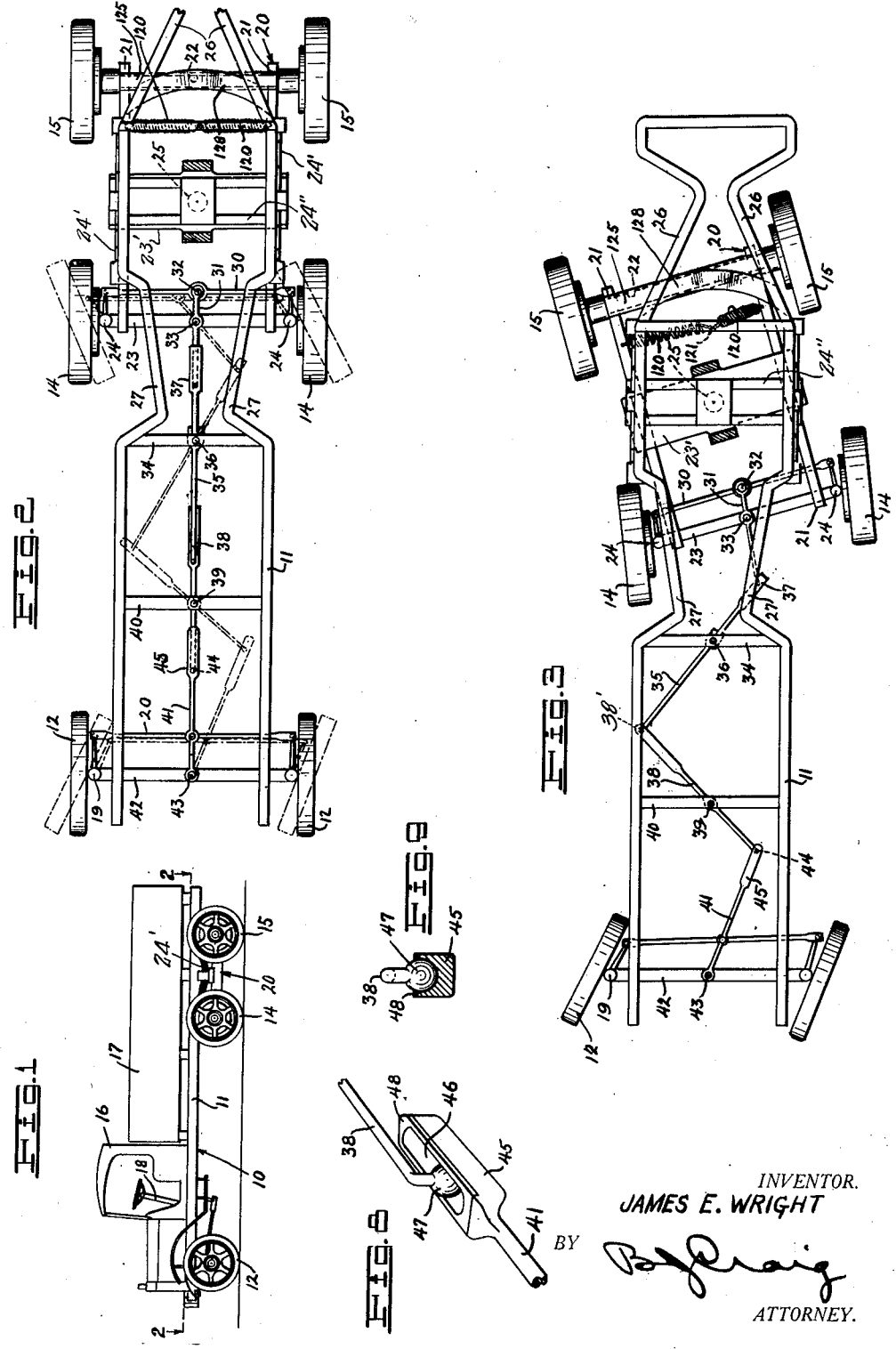

Oct. 15, 1929.   J. E. WRIGHT   1,731,557
HIGHWAY VEHICLE
Filed Jan. 23, 1926   2 Sheets-Sheet 2

INVENTOR.
JAMES E. WRIGHT
BY
ATTORNEY.

Patented Oct. 15, 1929

1,731,557

UNITED STATES PATENT OFFICE

JAMES E. WRIGHT, OF LOS ANGELES, CALIFORNIA

HIGHWAY VEHICLE

Application filed January 23, 1926. Serial No. 83,226.

This invention relates to highway vehicles.

The general object of the invention is to provide an improved highway vehicle whereby in a plurality of supporting wheels are provided at each side of one end of the vehicle and wherein novel means is provided for steering by means of said wheels.

Another object of the invention is to provide a motor vehicle with four rear wheels mounted so that all four wheels may swing for steering purposes.

A further object of the invention is to provide an improved means for steering tandem wheels of highway vehicles.

Another object of the invention is to provide a motor vehicle wherein the rear of the vehicle is provided with tandem wheels arranged on a frame and wherein the entire frame may swivel and wherein means is provided for turning certain of said wheels independently of the swiveling action of the truck.

An additional object of my invention is to provide novel driving means for tandem wheels of motor vehicles.

Other objects of the invention will be apparent from the following description taken in connection with the accompanying drawings, wherein:

Fig. 1 is a side elevation of a truck embodying the features of my invention;

Fig. 2 is a sectional view taken on line 2—2, Fig. 1 showing only the main chassis frame and steering mechanism;

Fig. 3 is a view similar to Fig. 2 showing the wheels in turning position;

Fig. 8 is a perspective view of one of the swiveling slip joints;

Fig. 9 is a cross section through the swiveling joint and

Figure 4:
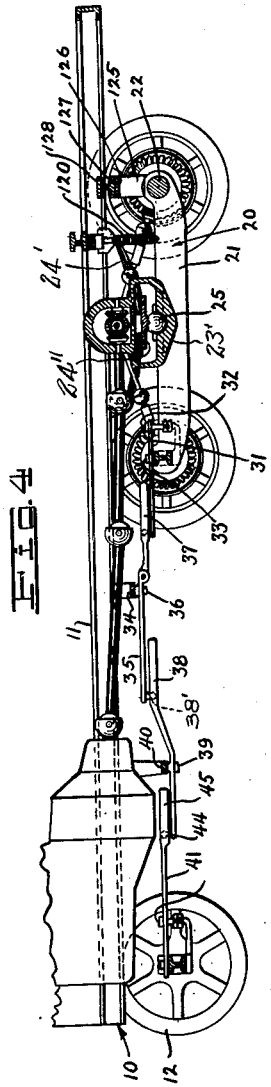
Fig. 4 is a longitudinal section of a vehicle showing the driving mechanism.

Referring to the drawing by reference characters I have shown a motor vehicle embodying the features of my invention generally at 10. This vehicle comprises a chassis including a frame 11 having a pair of front wheels 12 thereon and having two pairs of rear wheels 14 and 15.

The motor vehicle is shown as of the truck type and is provided with a cab 16, a body 17 which may be of any desired character and a steering wheel 18.

In the embodiment of my invention shown in Fig. 1 the front wheels 12 are mounted to turn about vertical axes 19. The front wheels are adapted to be shifted by means of a rod 20 in the usual manner.

The two pair of rear wheels 14 and 15 are mounted on a truck or frame indicated generally at 20. This truck or frame comprises longitudinally extending side members 21, end transverse members or axes 22 and 23 and an intermediate cross member 23'. The wheels 15 are shown as mounted for rotary movement about the axis of the transverse member 22 but do not shift their axis relative to the axis of the member 22. The front wheels 14 of the truck are mounted to turn about the axes of the transverse member 23 when the truck is moving in a straight line and to shift about vertical axes 24 when the truck or frame 20 is turning.

The frame is provided with springs 24' at each side and these springs are connected by a cross member 24". This cross member 24" has a swivel member 25 thereon which engages a companion swivel member on the cross member 23' of the truck. This provides a centrally swivelling truck. The frame of the truck is bent inwardly as at 26 and at 27 to accommodate the wheels 14 and 15 when the truck is turning relative to the frame 11.

The front wheels 14 of the truck are connected by a member 30 to which a lever 31 is pivoted at 32 for steering. This lever 31 is also pivoted at 33 to the transverse member 23.

Mounted on a brace 34 of the frame 11 I arrange a lever 35. This lever 35 is pivoted at 36 to the brace 34 and engages the lever 31 in a sliding pivotal joint 37. The lever 35 at the other end is connected by another slidable pivotal joint 38' to a lever 38 pivotally mounted at 39 to a brace 40 on the frame 11. This lever 38 in turn engages a lever 41 pivoted to the front axle 42 at 43. This lever 41 also pivotally and slidably engages the lever 38 at 44. The sliding joints 44, 38' and 37 are of a similar construction and a description of the joint 44 will suffice for all. The sliding joints compensate for the change in distance between the pivoting points as the levers swing. In Fig. 8 I have shown a joint 44 which I prefer to use although other joints may be used if desired. This joint comprises an enlargement 45 on the rod 41. This enlargement has a recess 46 therein in which I fit a ball member 47 which is mounted on the member 38 which is the companion lever. The ball member is held in place by means of a plate 48 as shown in Fig. 9.

My invention may be embodied in a trailer or other highway vehicle. It may also be embodied in a motor vehicle and in order to propel the motor vehicle I connect the driving shaft 50 with one element of a universal joint 51. The other element of the universal joint is connected to a shaft 52 which is in turn connected to a universal joint 53. This universal joint 53 is connected to a shaft 54 which drives a differential 56 which is mounted in a housing 57 secured to the body 11. This differential may be of the type generally employed in automobile transmissions and a further description thereof is believed unnecessary. The differential is adapted to drive two shafts 58 and 59. Each side of the rear truck is similar, so I will now proceed to describe one side thereof, although it will be understood that both sides are of like construction. The shafts 58 and 59 drive bevel gears 60. Each bevel gear drives a front bevel gear 61 and a rear bevel gear 62. The front bevel gear 61 through universal joints 64 and a slip joint 65 drives a gear 66 which engages a gear 67 on the wheel 14. The gear 66 is adapted to swing about the axis of the joint 24 as the front wheel turns so that the gears 66 and 67 are in constant driving engagement.

The gear 62 drives a gear 68 through a universal joint 69, sliding shaft 70 and universal joint 71. In some cases either the universal joint 69 or the joint 71 may be omitted. This gear 68 meshes with the gear 72 which is fixed on the wheel 15. From the foregoing description it will be apparent that the operation of the shaft 50 will cause constant rotation of the driving wheels 14 and 15.

Figure 6:
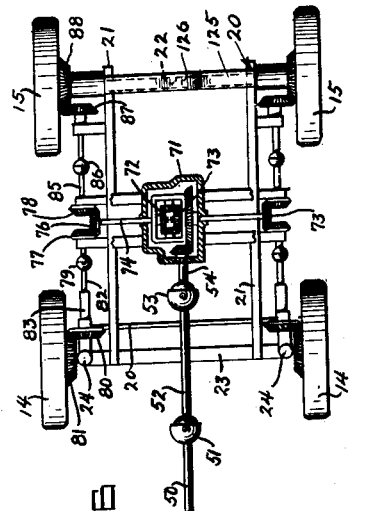
Fig. 6 is a top plan view partly in section of a modified form of driving mechanism.

In Fig. 6, I show a slightly modified form of drive wherein the driving shaft 50 drives the shafts 52 and 54 through universal joints 51 and 53. The shaft 54 serves to operate a differential 71. This differential is fixed to the frame 11 and drives bevel gears 72 and 73. The gear 72 drives a shaft 74 which has a bevel gear 76 thereon and which meshes with a bevel gear 77 and 78. The bevel gear 77 drives the universal joint 79 which in turn drives a bevel gear 80 arranged to engage a bevel gear 81 fixed on the wheel 14. The shaft 82 on which the bevel gear 80 is secured is pivotally mounted to turn about the axis of the joint 24 so that the wheel 14 will be driven regardless of its angular relation to the frame of the vehicle or to the truck 20. The shaft 82 is provided with a slip joint 83 so that this shaft may be lengthened and shortened as the front wheel turns. The bevel gear 78 drives a shaft 85 which is connected to a universal joint 86 which drives a gear 87 meshing with the gear 88 which is fixed on the wheel 15. It will thus be apparent that rotation of the shaft 50 will cause the wheels 14 and 15 to be constantly driven.

Figure 7:
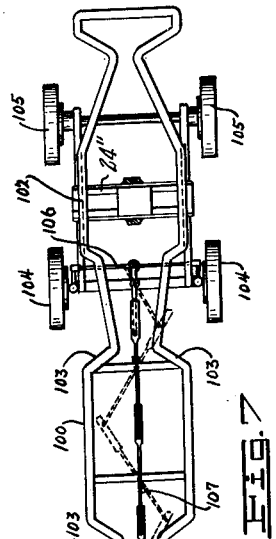
Fig. 7 is a view similar to Fig. 2 showing the steering truck at both the front and rear.
Figure 5:
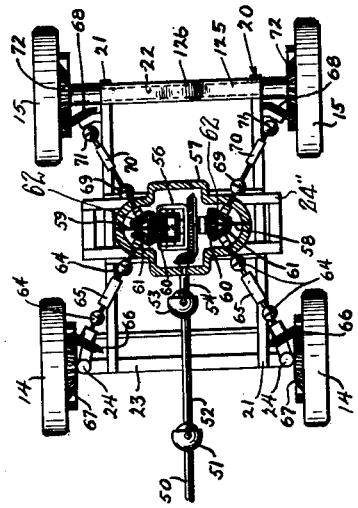
Fig. 5 is a top plan view, partly in section, showing the driving mechanism.

In Fig. 7 I show a slight modification of my invention wherein the frame 100 is provided with a front swiveling truck 101 and a rear swivelling truck 102. The frame is recessed at 103 on both sides to accommodate the swivelling trucks. In each truck the front pair of wheels 104 are mounted for swinging movement independently of the trucks themselves, while the rear wheels 105 are fixed relative to the trucks. Both of the trucks have the front wheels arranged to steer by means of members 106 and these members are shown as connected by a device 107 comprising pivotally connected extensible levers, so that upon turning the front member 106 the device 107 will assume the dotted line position to cause simultaneous swinging of the front wheels on each truck.

In order that there will be a normal tendency to maintain the steering truck and the body in alignment, I provide a pair of springs 120. One end of each spring is secured to opposite sides of the swivelling truck and the other end of each spring is secured at 121 to a transverse member on the body. The springs are so adjusted that as soon as the swiveling truck moves out of alignment with the body one of the springs will be placed in tension to urge the truck back into proper alignment. In this manner I avoid any difficulty due to skidding action, or to bounding from the highway.

Figure 10:
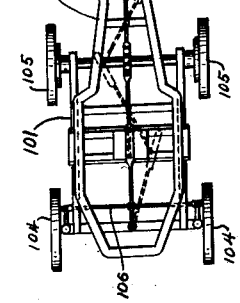
Fig. 10 is a rear view showing the centering spring.

In order to hold the truck and body in normal alignment I arrange a spring 125 on the truck. This spring includes an upwardly curved resilient portion 126 which coacts with a companion recess 127 in a member 128 mounted on the body. From a study of Fig. 10 it will be apparent that the resilient action of the member 125 will normally hold the truck in alignment with the body without, however, interfering with the steering action. Other aligning means may be used if desired.

In steering a truck, embodying the features of my invention, to the right from the solid line position shown in Fig. 2 the operator would move the steering wheel in the proper direction to shift the front wheels to the position shown in dotted lines. This action would immediately shift the rear wheels to the position shown in dotted lines. As soon as this action occurred the track of the four wheels on the truck woud cause this entire truck to swing about the swivel 25 and the truck would quickly take the position shown in Fig. 3 so that the turn would be made about an extremely short radius. As soon as the front wheels were righted the truck would be in alignment due to the action of the springs 120.

Having thus described my invention, I claim:

1. In a vehicle, a frame, said frame having a pair of wheels thereon for steering, a truck, means to pivotally mount said truck on said frame, said truck having front and rear wheels thereon, the rear wheels of said truck being rotatable about fixed horizontal axes rigid relative to said truck, the front wheels of said truck being rotatable about horizontal axes and said axes being shiftable each about a vertical axis for steering purposes, a transverse rod connecting both of said front wheels whereby said wheels may be shifted simultaneously, a lever pivoted to said rod and to said truck, a second lever, said first lever being pivotally and slidably connected to the second lever, a third lever, said second lever being pivotally and slidably connected to the third lever, said second lever and said third lever having a hinge joint in the rear of its intermediate pivot point, a fourth lever, said third lever being pivotally and slidably connected to the fourth lever, said fourth lever being pivoted to said frame and to a rod connecting the wheels on said frame whereby when said wheels on said frame are shifted for steering, said front wheels on said truck will be shifted through the medium of said levers.

2. In a motor vehicle including a frame having a pair of steerable wheels supporting the front end, and a swivelled bogie truck having a pair of steerable front wheels supporting the rear end, means for simultaneously steering the vehicle front wheels and the bogie front wheels, the top of the bogie wheels projecting above the lower portion of said frame, said frame including parallel side members, said side members each including an inwardly bent portion adjacent to the bogie front wheels and a similar inwardly bent portion adjacent to the bogie rear wheels.

3. In a motor vehicle having a pair of steerable wheels supporting the front end, and a swivelled bogie truck having a pair of steerable front wheels supporting the rear end, means for simultaneously steering the vehicle front wheels and the bogie front wheels comprising a plurality of pivotally connected levers, all of said levers being located in advance of said swivel connection, said pivotal connections including sliding joints, and said levers being horizontally disposed.

4. In a motor vehicle having a pair of steerable wheels supporting the front end, and a swivelled bogie truck supporting the rear end, and having a pair of steerable front wheels, means for simultaneously steering the vehicle front wheels and the bogie front wheels comprising a lever pivotally supported on the vehicle front axle and operatively connected to the vehicle front wheels, a second lever pivotally supported on the bogie truck in advance of its swivel connection and operatively connected to the steerable wheels on the bogie truck and means including said last mentioned devices for connecting said levers.

In testimony whereof, I hereunto affix my signature.

JAMES E. WRIGHT.